Sept. 20, 1971  HANS PÖLLINGER  3,606,294
BALANCING VALVE FOR A LOAD-RESPONSIVE BRAKE PRESSURE REGULATOR
Filed July 25, 1969  3 Sheets-Sheet 1

INVENTOR
HANS PÖLLINGER
Edmund M. Jaskiewicz
ATTORNEY

United States Patent Office 3,606,294
Patented Sept. 20, 1971

3,606,294
BALANCING VALVE FOR A LOAD-RESPONSIVE
BRAKE PRESSURE REGULATOR
Hans Pöllinger, Munich, Germany, assignor to
Knorr-Bremse G.m.b.H., Munich, Germany
Filed July 25, 1969, Ser. No. 844,778
Claims priority, application Germany, July 26, 1968,
P 17 80 045.2
Int. Cl. B60g 13/02
U.S. Cl. 267—8
10 Claims

ABSTRACT OF THE DISCLOSURE

A load-responsive brake pressure regulator for railway vehicles has a balancing or weighing valve mounted between the frame and suspension on the undercarriage. The valve has a housing mounted on the frame and a pressure plate fastened upon the suspension moveable within the housing. The housing has a chamber connected to the air braking system closed by a diaphragm with valve means regulating the pressure within the chamber in response to the weight of the vehicle. A number of spring elements are uniformly distributed between the pressure plate and annular surface within the housing and at least one spring element is between the pressure plate and the diaphragm. An annular member of a resilient synthetic plastic material may be used between the pressure plate and annular surface and a cylindrical member of like material between the pressure plate and diaphragm.

---

The present invention relates to load-responsive brake pressure regulators for railway vehicles, more particularly, to a balancing valve in the regulator mounted between the vehicle frame and a suspension on the undercarriage.

Railway vehicles have been provided with such load-responsive brake pressure regulators having a chamber therein connected to the air braking system and closed by a flexible diaphragm which is subjected to a portion of the weight of the vehicle. A pressure regulating valve regulated the pressure within the chamber in response to actuation of the diaphragm. This type of regulating valve generally employs a hydraulic pressure valve for transmitting a portion of the weight of the vehicle to the diaphragm. The cell is generally arranged between the suspension and an annular housing element of the weighing valve. A step piston is positioned between the pressure valve and the diaphragm and is freely moveable in a central chamber of annular housing. The step piston thus transmits forces to the diaphragm which are at a considerably reduced ratio from the high forces exerted on the piston itself.

The construction of such a hydraulic cell presents significant problems because the cells are filled with a hydraulic fluid under pressure and therefore high pressure seals must be provided between the moving components of the balancing valve. As a result, such pressure cells are relatively expensive to manufacture. Further, when such cells absorb such high pressures the hydraulic fluid tends to diffuse through the resilient walls of the pressure cell.

It is therefore the principal object of the present invention to provide a novel and improved balancing valve for a load-responsive brake pressure regulator for a railway vehicle.

It is another object of the present invention to provide a balancing valve of the type described above which will eliminate the relatively expensive fluid pressure cells.

According to the present invention a balancing or weighing valve may comprise a housing mounted on the vehicle frame with an annular surface being within the housing. The moveable pressure plate is fastened upon the suspension of the undercarriage of the railway vehicle and is moveable within the housing. The housing has a chamber therein which is connected to the air braking system and a diaphragm closes one wall of the chamber. Valve means are provided for regulating the pressure in the chamber in response to the weight of the vehicle. Resilient means which may be in the form of individual spring elements or resilient synthetic plastic materials are positioned between the housing annular surface and the pressure plate and between the pressure plate and the diaphragm for transmitting jointly the weight of the vehicle to the suspension so that the diaphragm is subjected to a portion of the weight of the vehicle. The resilient means may also comprise synthetic or natural rubber elements and the elements may have uniform or different properties of elasticity. Each element may consist of a single integral body or may be formed of several parts.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modifications of present invention will be described in detail.

Figure 1:
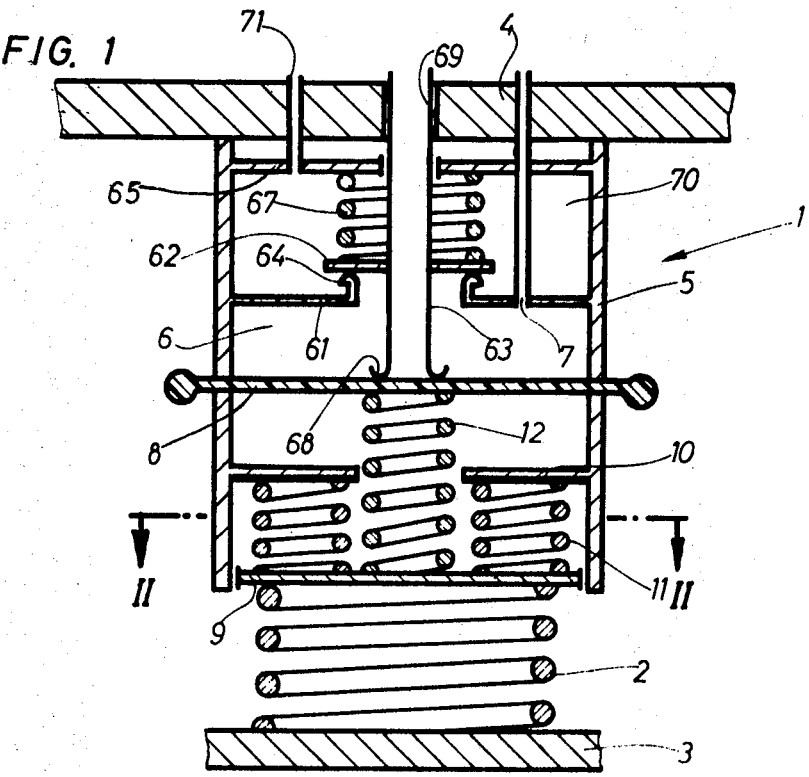
FIG. 1 is a vertical sectional view of one embodiment of a weighing valve according to the present invention utilizing spring elements.

As may be seen in FIG. 1 a balancing valve according to the present invention is indicated generally at 1 and is positioned between the spring suspension 2 which is on a bracket 3 mounted upon a bogie or truck of a railway vehicle. The valve comprises a housing 5 attached to the underside of a vehicle frame 4. The housing 5 has a chamber 6 with a conduit or passage 7 for connecting with the air braking system of the vehicle which is not shown.

One wall of the chamber 6 is closed by a flexible diaphragm 8 and another wall is formed by a partition 61 having a central opening about which is formed a valve seat 64 engaged by a valve member 62 constructed as annular shoulder on a hollow valve stem 63. The valve member 62 is urged into the closed position by a spring 67 whose other end engages a cover 65 of the housing 5. The lower end of the valve stem 63 is indicated at 68 and forms another valve with the diaphragm 8. The upper end 69 of the valve stem 63 is axially moveable through the cover 65 of the housing and the vehicle frame 4 and opens to the atmosphere. A suitable sliding seal is provided between the moveable valve stem 63 and the cover 65 so as to provide a tight seal therebetween. Between housing cover 65 and partition 61 there is formed a chamber 70 which is connected to the main air supply of the railway vehicle through a conduit 71.

Within the lower end of housing 5 there is a moveable pressure plate 9 fastened upon the suspension 2. An annular shoulder or member 10 is formed integral with the housing between the diaphragm 8 and the pressure plate 9. A plurality of spring elements 11 are uniformly distributed between the annular member 10 and the pressure plate 9 to exert pressure against the two elements. A spring element 12 is positioned at the center of pressure plate 9 and exerts a force against the diaphragm 8. The arrangement of the spring elements may be seen in FIG. 2.

Figure 3:
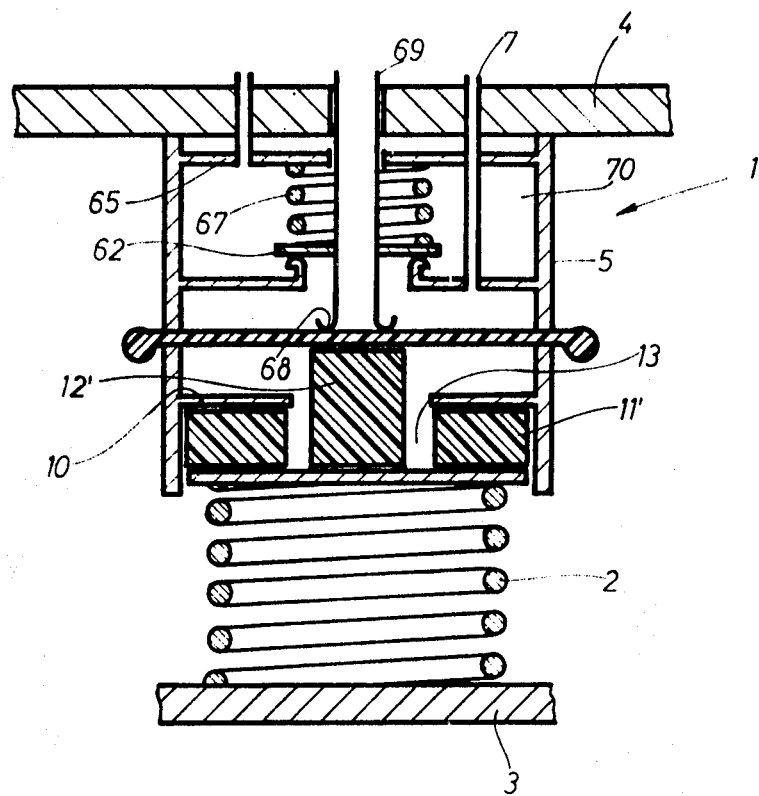
FIG. 3 is a view similar to that of FIG. 1 and shows a further embodiment of the present invention employing rubber resilient elements.

In FIG. 3 the weighting valve is similar to that shown in FIG. 1 except that the spring elements 11 and 12 are replaced by a resilient rubber ring 11' and a cylindrical element 12' respectively. The rubber ring and cylindrical rubber element are positioned to define an annular air space 13 therebetween so as to provide for elastic deformation of these elements without interfering with each other.

Figure 2:
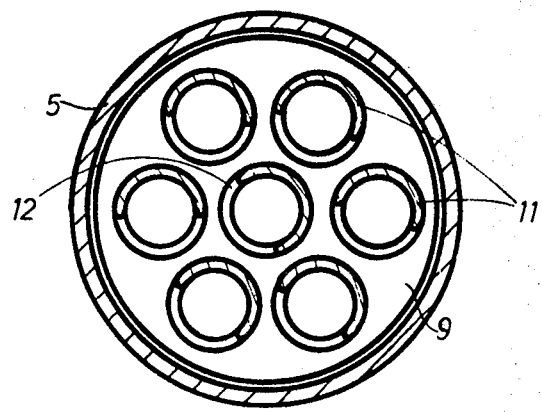
FIG. 2 is a sectional view taken along the line II—II of FIG. 1 and showing the distribution of the spring elements.

The operation of the balancing valves illustrated in FIGS. 1–3 is as follows:

The chamber 70 which directly communicates through conduit 71 with the source of compressed air for the vehicle is subjected to the forces exerted by the air under pressure therein. Within the chamber 6 there is load-responsive pressure communicating with the air braking system through line 7.

Should the weight of the vehicle increase, such as through loading, the resilient elements 11, 11', between the housing annular member 10 and pressure plate 9 are subjected to a corresponding increased pressure. A portion of this increased pressure will act through resilient elements 12, 12' directly upon diaphragm 8 which, as a result, will have an upward bulge in its center as viewed in the drawings. Since valve stem 63 will remain stationary under the force exerted by the resilient elements 12, 12' valve member 62 will raise from valve seat 64 against the force exerted by spring 67. The air underpressure in chamber 70 will then flow into chamber 6 until the pressure in chamber 6 is sufficiently increased to move diaphragm 8 back into its initial position with respect to housing 5 against the force of the resilient elements 12, 12'. As this occurs, valve stem 63 will be urged downwardly by spring 67 and valve member 62 will become seated on valve seat 64 to close chamber 70 from chamber 6. The increased pressure in chamber 6 will now corresponding to the increased load of the vehicle.

When a load is removed from the vehicle so that the weight of the vehicle is decreased, there will be a corresponding reduction in the force exerted against resilient members 11, 11' between the annular shoulder 10 and pressure plate 9. Since this action will mean there is excessive pressure in chamber 6 the resilient elements 12, 12' are under a corresponding increased force and diaphragm 8 will now be bulging downwardly at its center. This will cause the lower end 68 of valve end 63 to become separated from diaphragm 8 so that air may flow from chamber 6 through the valve stem 63 to the atmosphere until the pressure in the chamber is reduced to correspond to the reduced weight of the vehicle. The diaphragm 8 will then again be lifted by the resilient elements 12, 12' against the reduced pressure in chamber 6 so that the lower end 68 of valve stem 63 will close against diaphragm 8.

Figure 4:
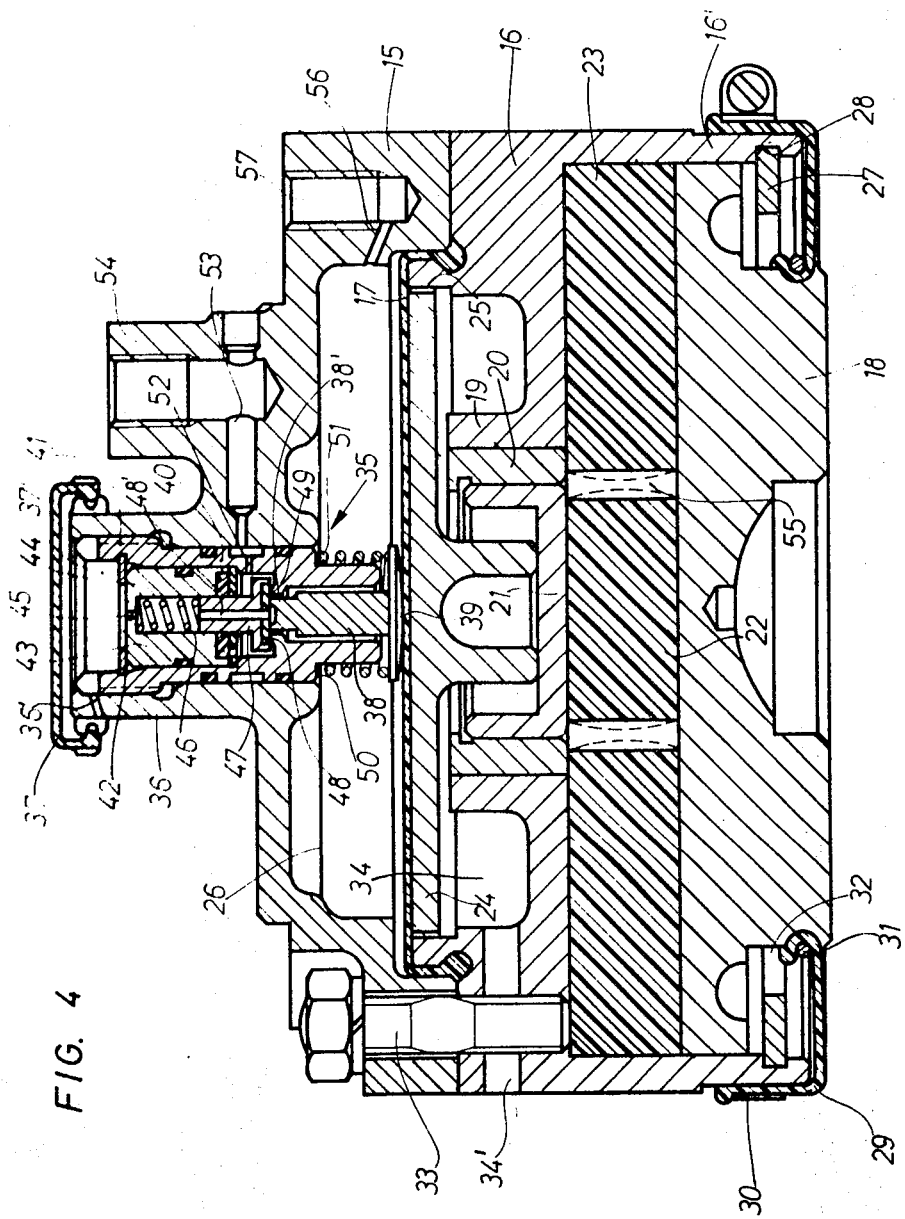
FIG. 4 is a sectional view similar to that of FIG. 3 of a further embodiment wherein an intermediate step piston is employed.

In FIG. 4 there is shown in greater detail a further modification of the present invention which is a preferred embodiment of the present invention. The weighing valve of FIG. 4 has an annular housing 16 with a top cover plate 15 and a diaphragm 17 stretched between the cover 15 and the housing. The lower end of housing 16 is provided with a cylindrical extension 16' in which is slideably mounted a piston-shaped pressure plate 18.

A resilient rubber ring 23 is positioned between the annular housing 16 and the pressure plate 18. The housing 16 is provided with an inner flange 19 within which there is a bushing 20. A piston 21 is slideably received within the bushing 20 and has its outer end resting on a cylindrical rubber element 22 positioned in the central chamber of resilient line 23 on the pressure plate 18. The cylindrical element 22 and ring 23 are so dimensioned with respect to each other that an annular space 55 is provided therebetween.

A piston 24 which has a substantially greater surface area than piston 21 is connected to the piston 21 for movement in a cylindrical portion 25 of the housing 16 and has its entire surface area resting upon a diaphragm 17 which together with cover 15 forms a chamber 26. A retaining ring 27 is positioned in an annular groove 28 formed within the lower end of the cylindrical extension 16' of the housing. A sealing sleeve 29 is positioned around the lower end of the cylindrical extension 16' with one end of the sleeve being fastened to the outer wall of the outer extension by a clamping band 30 and having its other end connected to a recessed surface 32 on pressure plate 18 by means of a resilient or spring ring 31. The housing cover 15 is secured to housing 16 by means of bolts 33 and may be attached to a vehicle frame not shown in the drawing. A chamber 34 is formed between piston 24 and housing 16 and communicates to the atmosphere through a bore 34'.

Within the chamber 26 there is a pressure regulating valve indicated generally at 35 and threaded into a neck 36 extending outwardly from cover 15. A protective cap 37 covers the neck 36 and forms a chamber 37' which communicates with the atmosphere through a bore 36' formed in the neck 36. The pressure regulating valve includes a stem 38 with a widened base 39 resting on diaphragm 17 and projecting into a valve housing element 40 whose upper end 41 is provided with an external thread for mating with an internal thread provided within neck 36. A washer 42 is seated in an annular groove formed at the upper end 41 of the pressure regulating valve 35 and forms a support for an insert 43 having a central bore 44 and a small outlet 45. Within bore 44 there is a cylindrical guide element 47 of an axially perforated valve disc 48 which bears against a spring 46. The valve disc 48 is urged by spring 46 against an annular shoulder 49 within the valve housing element 40 to form a valve seat 48, 49 with the valve disc 48. The valve also forms a valve seat 38', 48 with the upper end of stem 38. A spring 51 is positioned between the base 39 and an annular shoulder 50 formed on the outer surface of pressure regulating valve 35. There is a radial bore 52 in the valve housing element 40 above the valve disc 48. The bore 52 communicates with a bore 53 in the cover 15 which is provided with a connecting flange 54 for an air conduit connected to a source of compressed air. The chamber 26 which is between diaphragm 17 and cover 15 communicates through bore 56 with a connection 57 for an air line leading to the air braking system, but not shown in the drawings.

The valve illustrated in FIG. 4 operates as follows:

When the weight of the vehicle is increased, the housing element 16 presses with increased force against the rubber ring 23 which is now subjected to a certain amount of elastic deformation. Since this increase force does not act in a similar manner through the double piston 21, 24 against the cylindrical element 22, this double piston will lag somewhat behind the movement of the annular housing element 16. As a result, the stem 38 will be moved upwardly into the housing 40 against the force of spring element 51 so that the valve disc 48 becomes separated from its valve seat against the force of spring 46. Air under pressure will thus enter through bores 53, 52 into the valve housing element 40 into the chamber 26 within which the pressure increases until the double piston 21, 24 is pressed downwardly distance corresponding to the axial displacement of the housing 16. The cylindrical rubber element 22 will be deformed outwardly by this force as indicated by the dashed lines in the drawings. The annular gap 55 between the rubber elements 22 and 23 is of sufficient width so that the both rubber elements can be deformed radially outwardly a predetermined amount without contacting each other. As a result of the increased pressure in chamber 26 the double piston 21, 24 will move downwardly so that the valve stem 38 will again be pushed outwardly from the valve housing 40 under the force exerted by spring 51. The valve disc 48 will be urged by spring 46 to close the valve when there is an increased pressure in chamber 26 which corresponds to the increased weight of the vehicle.

When the weight of the vehicle is reduced, the force exerted by the annular housing element 16 on the rubber ring 23 will be decreased. As a result, the housing 16 together with the cover 15 and valve housing 40 which is threaded to the cover will move upwardly with respect to the valve stem 38 and the spring 51 acting against the valve stem 38 through base 39 will cause the valve stem 38 to be separated from the valve disc 48. Air will then flow from chamber 26 outwardly of the valve through bore 48' in valve disc 48, bores 44 and 45 in insert 43 into chamber 37' and out through bore 36' until the pressure in chamber 36 is reduced by an amount corresponding to the decrease in the weight of vehicle frame. This reduction in air pressure in the chamber 26 will bring about a decrease in the force exerted by the piston 21, 24 against the cylindrical rubber element 22. The double piston 21, 24 will then also be lifted so as to close the valve when stem 38 contacts the valve disc 48.

It is pointed out that the invention as disclosed is not limited to the modifications which have been described and illustrated herein. The structure comprising resilient elements between pressure plate 18, the housing 16 and the double piston 21, 24 may comprise a continuous and integral rubber disc whose elastic properties are different where acted upon by the double piston 21, 24 and the housing 16. As a result of these elastic properties, with differential loads acting on the housing 16 and double piston 21, 24 the rubber disc will be compressed different thicknesses corresponding to the difference in loads with this difference in thickness existing between its outer portion acted upon by the annular housing element and its central portion which is acted upon by the piston 21. This resilient structure may be provided with different elastic properties both when a natural or synthetic rubber is used or when these components are formed from a resilient synthetic resin.

It will be understood that this invention is susceptible to modification in order to adapt it to different usages and conditions.

What is claimed is:

1. In a balancing valve assembly for a load-responsive brake pressure regulator mounted between the frame and suspension on the under-carriage of a railway vehicle, the combination of a housing mounted on the vehicle frame and having an annular surface therein, a movable pressure plate within said housing and fastened upon said suspension, a chamber within said housing connected to the air braking system, a flexible diaphragm within said housing closing said chamber, valve means for regulating pressure in said chamber in response to the weight of the vehicle, and resilient means between said annular surface and said pressure plate and between said diaphragm and pressure plate for transmitting jointly the weight of the vehicle to the suspension whereby said diaphragm is subjected to a portion of the weight of the vehicle.

2. In a balancing valve assembly as claimed in claim 1 wherein said resilient means comprises a plurality of springs, at least one spring being between said pressure plate and said diaphragm and the remaining springs being uniformly distributed between said annular surface and said pressure plate.

3. In a balancing valve assembly as claimed in claim 1 wherein said resilient means comprises resilient synthetic resin materials, synthetic rubber or natural rubber.

4. In a balancing valve assembly as claimed in claim 3 wherein the resilient means between the pressure plate and said annular surface and between the pressure plate and said diaphragm has similar elastic properties.

5. In a balancing valve assembly as claimed in claim 3 wherein the resilient means between the pressure plate and annular surface and between the pressure plate and diaphragm has different elastic properties.

6. In a balancing valve assembly as claimed in claim 3 wherein the resilient means between said pressure plate and annular surface comprises an annular rubber member, the resilient means between said pressure plate and diaphragm comprising a cylindrical rubber member.

7. In a balancing valve assembly as claimed in claim 6 wherein each of said rubber members comprises a plurality of parts.

8. In a balancing valve assembly as claimed in claim 6 wherein there is an annular space between said annular and cylindrical rubber members to permit compression of said members without contacting each other.

9. In a balancing valve assembly as claimed in claim 1 wherein said housing has a cylindrical extension, said pressure plate comprising a piston slideably mounted within said cylindrical extension.

10. In a balancing valve assembly as claimed in claim 9 and comprising a sealing sleeve interconnecting said piston pressure plate and said cylindrical extension.

References Cited

UNITED STATES PATENTS

| | | | |
|---|---|---|---|
| 2,859,978 | 11/1958 | Brimhall | 267—8 |
| 3,112,923 | 12/1963 | Ley | 267—34 |

JAMES B. MARBERT, Primary Examiner

U.S. Cl. X.R.

267—34